US007761004B2

(12) United States Patent
Yamada et al.

(10) Patent No.: US 7,761,004 B2
(45) Date of Patent: Jul. 20, 2010

(54) ELECTRONIC APPARATUS, LIGHTING APPARATUS AND METHOD OF CALCULATING ELECTRIC QUANTITY THEREOF

(75) Inventors: Naoto Yamada, Yokohama (JP); Hideki Matsui, Fujisawa (JP); Zhaoxiang Chen, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/285,288

(22) Filed: Oct. 1, 2008

(65) Prior Publication Data

US 2009/0074397 A1 Mar. 19, 2009

Related U.S. Application Data

(63) Continuation of application No. PCT/JP2007/000361, filed on Apr. 3, 2007.

(30) Foreign Application Priority Data

Apr. 5, 2006 (JP) ............................ 2006-104044

(51) Int. Cl.

| | |
|---|---|
| ***G03B 7/26*** | (2006.01) |
| ***H05B 37/00*** | (2006.01) |
| ***H05B 39/00*** | (2006.01) |
| ***H05B 41/14*** | (2006.01) |

(52) U.S. Cl. ................. 396/279; 315/241 P; 315/241 S

(58) Field of Classification Search ................. 396/279, 396/277, 155, 176–178; 315/341 P, 241 S See application file for complete search history.

(56) References Cited

U.S. PATENT DOCUMENTS

| | | | |
|---|---|---|---|
| 5,070,357 | A | 12/1991 | Kazami et al. |
| 6,295,413 | B1 | 9/2001 | Ogasawara |

FOREIGN PATENT DOCUMENTS

| | | |
|---|---|---|
| JP | A-60-230640 | 11/1985 |
| JP | A 3-175432 | 7/1991 |
| JP | A 5-5934 | 1/1993 |
| JP | A 9-54360 | 2/1997 |
| JP | A 10-341536 | 12/1998 |
| JP | A 2000-241861 | 9/2000 |
| JP | A 2001-258165 | 9/2001 |
| JP | A 2003-215666 | 7/2003 |
| JP | A 2004-38092 | 2/2004 |

OTHER PUBLICATIONS

European Search Report issued on Dec. 11, 2009 for European Patent Application No. EP 07 73 7018.

*Primary Examiner*—Rochelle-Ann J Blackman
(74) *Attorney, Agent, or Firm*—Oliff & Berridge, PLC

(57) ABSTRACT

A fully charged battery or an unused battery is set in a battery box of a lighting apparatus. A user turns on an illumination electric source of the apparatus and selects the battery. A maximum number of lighting times Smax when the lighting apparatus causes manual full lighting M1/1 by using the selected battery is stored in a memory of a microcomputer or IC by a user according to an operating button or an instruction on a liquid crystal screen. Next, the user performs normal shooting. A lighting amount (TTL lighting, manual full lighting, or the like) when the user performs shooting is converted to manual full lighting M1/1 to be obtained as a number of lighting times. By comparing the obtained number of lighting times with the maximum number of lighting times Smax, how many times of lighting can still be performed at a maximum is calculated.

17 Claims, 7 Drawing Sheets

START
S1 SET PULSE NUMBER Pfull OF M1/1
SET MAXIMUM NUMBER OF LIGHTING TIMES Smax AT M1/1 FOR EACH BATTERY
S2 READ OUT MAXIMUM NUMBER OF LIGHTING TIMES Smax AT MANUAL M1/1 AND THE PULSE NUMBER Pfull AT MANUAL M1/1 FROM RECORDING MEDIUM
S3 DEFINE PULSE NUMBER AT EACH LIGHTING AS Psin
DEFINE INTEGRATED VALUE OF PULSE NUMBER AT EACH LIGHTING AS Pint
DEFINE NUMBER OF LIGHTING TIMES AT M1/1 AS Sm1/1
S4 WHEN USER TAKES PICTURE AND LIGHT IS EMITTED, START CALCULATION FOR INDICATING REMAINING BATTERY
S5 Pint = Pint + Psin
S6 Pint≧Pfull
NO
YES
S7 Sm1/1 = Sm1/1 +1
S8 Sint = Pint − Pfull
S9 DISPLAY NUMBER OF TIMES CAPABLE OF LIGHTING
END

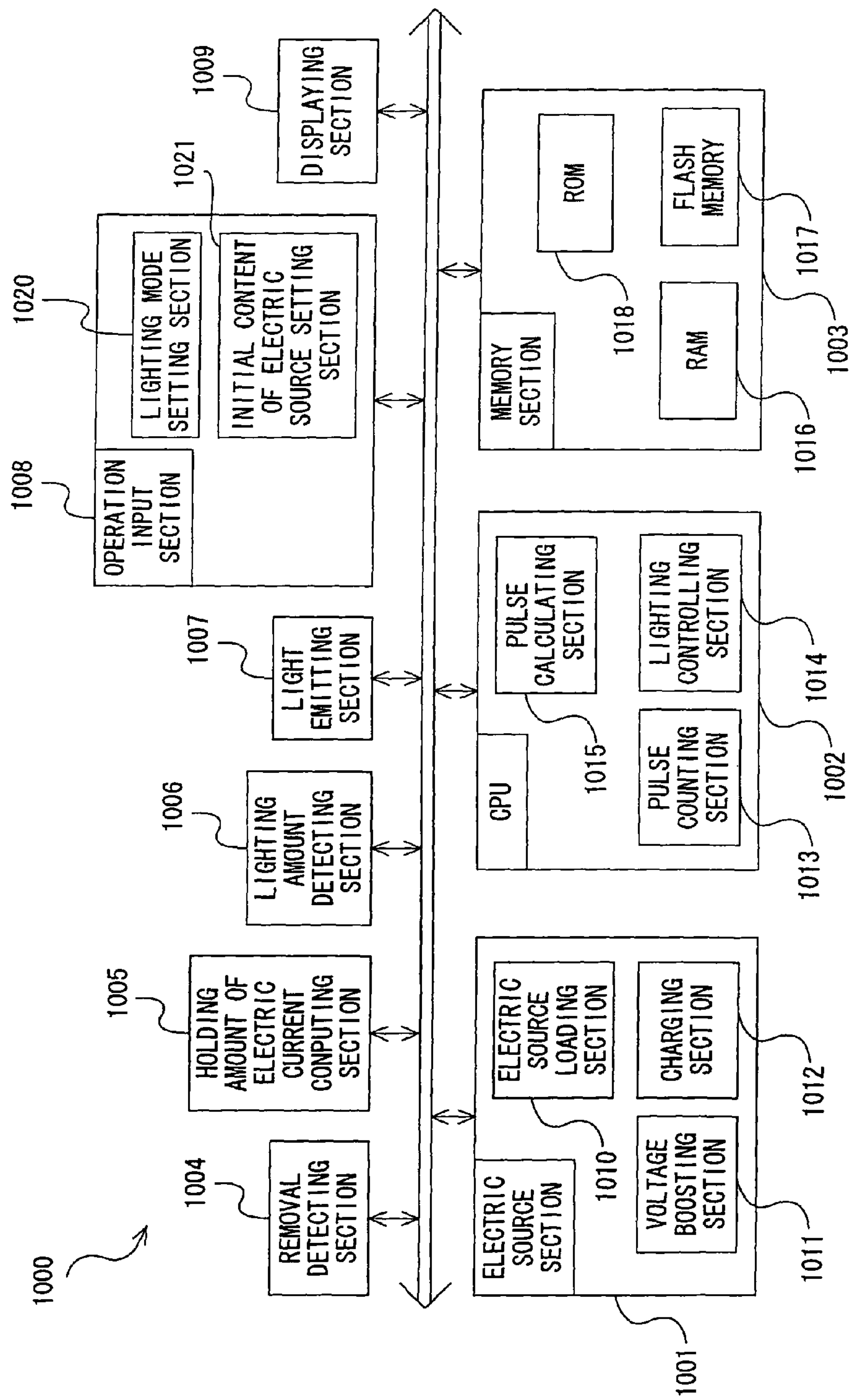
Fig. 10
1000
REMOVAL DETECTING SECTION
1004
HOLDING AMOUNT OF ELECTRIC CURRENT COMPUTING SECTION
1005
LIGHTING AMOUNT DETECTING SECTION
1006
LIGHT EMITTING SECTION
1007
OPERATION INPUT SECTION
1008
LIGHTING MODE SETTING SECTION
1020
INITIAL CONTENT OF ELECTRIC SOURCE SETTING SECTION
1021
DISPLAYING SECTION
1009
ELECTRIC SOURCE SECTION
1001
ELECTRIC SOURCE LOADING SECTION
1010
VOLTAGE BOOSTING SECTION
1011
CHARGING SECTION
1012
CPU
1002
PULSE COUNTING SECTION
1013
PULSE CALCULATING SECTION
1015
LIGHTING CONTROLLING SECTION
1014
MEMORY SECTION
1003
RAM
1016
ROM
1018
FLASH MEMORY
1017

ELECTRONIC APPARATUS, LIGHTING APPARATUS AND METHOD OF CALCULATING ELECTRIC QUANTITY THEREOF

CROSS-REFERENCE TO RELATED APPLICATION

This application is a Continuation Application of International Application No. PCT/JP2007/000361, filed Apr. 3, 2007, designating the U.S., in which the International Application claims a priority date of Apr. 5, 2006, based on prior filed Japanese Patent Application No. 2006-104044, the entire contents of which are incorporated herein by reference.

BACKGROUND

1. Field

The present application relates to an electronic apparatus such as lighting apparatus or the like of performing a battery remaining content indication suitable for each of batteries different in physical properties, in the electronic apparatus such as lighting apparatus or the like which can use multiple types of batteries (alkaline battery, nickel hydride battery, and the like) different in physical properties, and to a method of computing an electric quantity thereof.

2. Description of the Related Art

A conventional lighting apparatus of a camera has indicated a battery used-up indication such as "Please replace the battery", and performed the processing of shortening the charge time of the main capacitor to finish charging, when the battery remaining content decreases and the charge time of the main capacitor exceeds a given time (see Patent Document 1: Japanese Unexamined Patent Application Publication No.

In the prior art, a user can recognize the necessity for battery replacement by the battery used-up indication or the charge time shortening of the main capacitor. However, how many times a lighting apparatus can still emit light differs in accordance with the type of battery and a lighting amount per one lighting, of the lighting apparatus. Thus, there is a problem that the user can not recognize how many times the lighting apparatus can still emit light. Therefore, if a battery is replaced in accordance with the battery used-up indication or the like, there may be a case of missing a photo opportunity.

SUMMARY

The present embodiments have been made in view of the problem of prior art as described above, and a proposition is to provide an electronic apparatus that can inform a user of a battery remaining content by converting the battery remaining content of the electronic apparatus such as lighting apparatus or the like, to a number of basic operation, in accordance with the type of batteries different in physical properties, and to provide a method thereof.

According to a first embodiment, there is provided an electronic apparatus, which can use a battery different in physical properties. The electronic apparatus includes an executing times of reference operation setting unit which converts a battery content initially stored in the battery to a used charge amount for a single reference operation of the apparatus and sets the battery content to a number of executing times of the reference operation, an executing times of reference operation calculating unit which converts a used charge amount of the battery to a charge amount used in the single reference operation and calculates the used charge amount of the battery as a number of reference operation of the apparatus, for each operation of the apparatus, a detecting unit which detects a battery remaining content or a used battery content as a number of executing times of reference operation based on the set number of executing times of reference operation and the calculated number of executing times of reference operation, and a displaying unit which displays the detected number of executing times of reference operation.

According to a second embodiment, there is provided a lighting apparatus of a camera, which can use a battery different in physical properties. The apparatus includes a lighting times setting unit which converts a charge amount initially stored in the battery to a charge amount used in a single reference lighting and sets the charge amount initially stored to a number of lighting times of the reference lighting, a reference lighting times calculating unit which calculates a used charge amount of the battery based on a lighting amount per one lighting and obtains the calculated used charge amount by converting it to a number of lighting times of the reference lighting, a detecting unit which detects a battery remaining content or a used battery content as a number of reference lighting times based on the set number of lighting times of reference lighting and the calculated number of lighting times of reference lighting, and a displaying unit which displays the detected number of reference lighting.

According to a third embodiment, there is provided the lighting apparatus of the camera according to the second embodiment, wherein the reference lighting times calculating unit counts the number of pulses at the time of lighting, compares the counted pulse number with a pulse number at the time of reference lighting, which is stored in advance, and converts the counted pulse number to a number of lighting times of the reference lighting.

According to a fourth embodiment, there is provided the lighting apparatus of the camera according to the second embodiment, wherein the reference lighting times calculating unit compares a used charge amount at the time of lighting with a used charge amount at the time of reference lighting, which is stored in advance, and converts the used charge amount at the time of lighting to the number of lighting times of the reference lighting.

Furthermore, a lighting apparatus for an imaging device according to the present embodiment includes a light emitting section which emits an illumination light illuminating a subject, an electric source loading section which loads a detachable electric source supplying electric power for the light emitting section to emit light, a lighting amount detecting section which detects a lighting amount of the light emitting section and converts it to a pulse number, a pulse calculating section calculates the pulse number converted by the lighting amount detecting section and stores it, a CPU which calculates a used electric quantity based on a pulse calculating value calculated by the pulse calculating section, and a displaying section which displays the calculated used electric quantity.

Furthermore, preferably, the lighting apparatus for an imaging device according to the present embodiment includes an initial content of electric source setting section which sets a content of the electric source when loading the electric source in the electric source loading section, wherein: the electric source is a fully charged nickel-hydride battery, unused lithium-ion battery, unused manganese battery, or unused alkaline battery; an initial battery content corresponding to the battery is set in the initial content of electric source setting section; the CPU calculates a remaining electric source content of the electric source based on the initial battery content set in the initial content of electric source setting section and the used electric quantity; and the displaying section displays the used electric quantity or the remaining electric source content.

Furthermore, preferably, the lighting apparatus for an imaging device according to the present embodiment includes a lighting mode setting section which selects and sets one lighting mode from a plurality of lighting modes that causes the light emitting section to emit light in a predetermined lighting amount, and a memory section which stores in advance a pulse number corresponding to the predetermined lighting amount in the plurality of lighting modes, wherein the CPU converts the used electric quantity or the remaining electric source content to a number of lighting times in a lighting mode selected by the lighting mode setting section, and the displaying section displays the number of section times converted by the CPU.

Furthermore, more preferably, the lighting apparatus for an imaging device according to the present embodiment includes a lighting mode setting section which sets a first lighting mode causing the light emitting section to emit an illumination light, or a second lighting mode which is used for calculation of a number of lighting times displayed in the displaying section, and a memory section which stores in advance a pulse number corresponding to a lighting amount of the lighting mode, wherein the CPU converts the used electric quantity or the remaining electric source content to a number of lighting times in the second lighting mode set by the lighting mode setting section, and the displaying section displays the number of lighting times converted by the CPU.

Furthermore, more preferably, the lighting apparatus for an imaging device according to the present embodiment includes a holding amount of electric current computing section which computes a holding amount of electric current of the lighting apparatus and converts it to a pulse number, wherein the pulse calculating section calculates the pulse number converted by the lighting amount detecting section, together with the pulse number converted by the holding amount of electric current computing section.

Furthermore, more preferably, the lighting apparatus for an imaging device according to the present embodiment is characterized in that the holding amount of electric current computing section computes a holding amount of electric current from a product of a period during which the holding current flows and a holding amount of electric current per unit time stored in advance in the memory section, the period being counted by the CPU, and converts it to a pulse number.

Furthermore, more preferably, the lighting apparatus for an imaging device according to the present embodiment includes an operating section inputting a reset signal that resets a calculated pulse number stored in the pulse calculating section, and a removable detecting section detecting mounting/dismounting of the electric source, wherein the calculated pulse number of the pulse calculating section is reset by the input of reset signal from the operating section or by the detection of mounting/dismounting of the electric source by the removable detecting section.

Furthermore, a method of computing a used electric quantity of a lighting apparatus for an imaging device that emits an illumination light illuminating a subject according to the present embodiment includes a lighting amount detecting step of detecting, when the lighting apparatus emits light, a lighting amount thereof to convert it to a pulse number, a pulse calculating step of calculating in sequence the pulse number corresponding to a plurality of lighting times to compute a pulse calculating value, and a used electric quantity calculating step of calculating a used electric quantity based on the pulse calculating value.

Furthermore, the method of computing an electric quantity that is used in the lighting apparatus for an imaging device that emits an illumination light illuminating a subject according to the present embodiment includes more preferably, a holding electric current calculating step of computing a calculating value of holding electric current from when a battery is loaded in the lighting apparatus, wherein the used electric quantity calculating step calculates a used electric quantity based on the pulse calculating value and the calculating value of holding electric current.

Furthermore, the method of calculating a remaining battery content by the lighting apparatus for an imaging device that emits an illumination light illuminating a subject, according to the present embodiment includes a battery content setting step of setting a full battery content of a detachable battery loaded in the lighting apparatus, a lighting amount detecting step of detecting, when the lighting apparatus emits light, a lighting amount thereof to convert it to a pulse number, a pulse calculating step of calculating in sequence the pulse number corresponding to a plurality of lighting times to compute a pulse calculating value, a used electric quantity calculating step of calculating a used electric quantity based on the pulse calculating value, and a remaining battery content computing step of computing a remaining battery content using the full battery content and the used electric quantity.

Furthermore, preferably, the method of computing the electric quantity used in the lighting apparatus for an imaging device that emits an illumination light illuminating a subject, according to the present embodiment includes the holding amount of electric current computing process of calculating a holding electric current integrated value from when a battery is loaded in the lighting apparatus, wherein the used electric quantity calculating process calculates a used electric quantity based on a pulse calculating value and a holding electric current integrated value.

The present embodiments can provide a lighting apparatus of a camera, electronic apparatus, and method thereof which can inform a user of a battery remaining content of the lighting apparatus of the camera and that of the electronic apparatus by converting them to a number of executing times of basic operation of the apparatuses, in accordance with the type of batteries different in physical properties.

BRIEF DESCRIPTION OF THE DRAWINGS

FIG. 10 is a block conceptual diagram of a lighting apparatus.

DETAILED DESCRIPTION OF THE EMBODIMENTS

Figure 1:
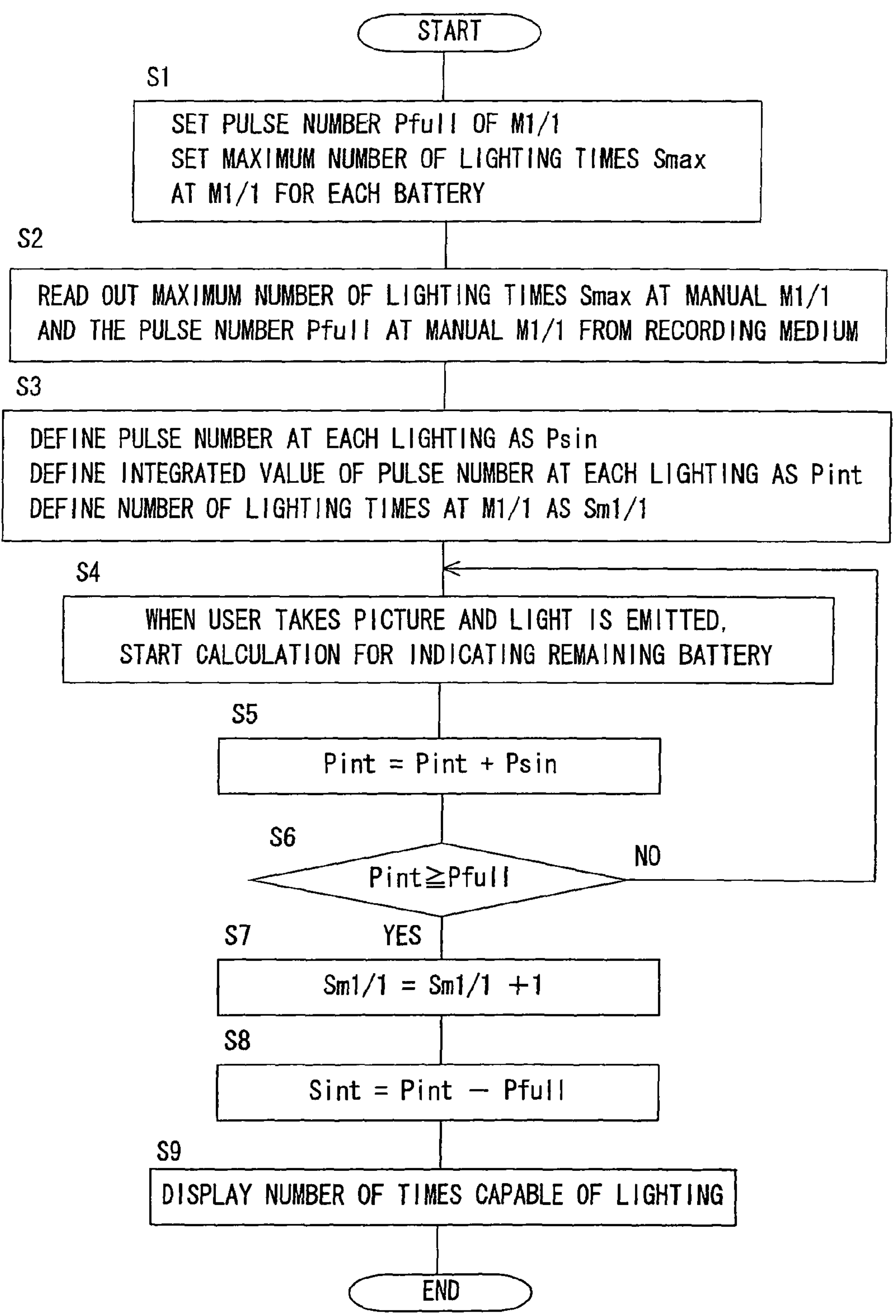
FIG. 1 is a flow chart showing an operation example of a first embodiment.

The embodiments shown in accompanying drawings will be described below.

Summary of Embodiments

FIGS. 1 to 4 are explanatory drawings of the first embodiment. In this embodiment, a lighting apparatus of a camera as an electronic apparatus will be described as an example.

First, a fully charged battery or an unused (new) battery is set in a battery box of a lighting apparatus. Next, a user turns on an electric source of the lighting apparatus and selects the battery set in the battery box. The types of battery to be selected include a rechargeable battery (secondary battery) such as lithium-ion rechargeable battery, nickel-hydride rechargeable battery, or the like, and a primary battery such as manganese dry battery, alkaline dry battery, or the like. If a user selects a battery to be used by an operation button, the maximum number of lighting times at manual full lighting by using the selected battery is read out from a memory of an IC to be set as Smax, and the number of controlling pulses that control a discharge amount necessary for discharging at manual full lighting is read out from the memory of the IC to be set as Pfull. Here, M1/1 indicates manual lighting, and M1/2 indicates the lighting when a lighting amount is half of that at full lighting. The maximum number of lighting times and the number of controlling pulses for each battery are stored in advance in a memory of an IC. The maximum number of lighting times and the number of pulses by each battery are adjusted and stored in the memory of the IC, to each lighting apparatus before factory shipment. Furthermore, the maximum number of lighting times may be otherwise set separately by a user.

Next, the user performs normal shooting. A lighting amount (TTL lighting, manual full lighting, or the like) when the user performs shooting is converted to that of manual full lighting M1/1 to be obtained as a number of lighting times. Thereafter, by comparing the obtained number of lighting times with the maximum number of lighting times Smax, it is calculated how many times of lighting can still be performed at a maximum.

Here, even if TTL lighting, manual lighting, and the like are mixed, each lighting amount is integrated and it is calculated how many times manual full lighting M1/1 was performed. That number of lighting times at manual full lighting M1/1 is compared with the maximum number of lighting times Smax at manual full lighting M1/1 by the battery that a user uses, and a battery remaining content is indicated. It is possible to easily know a charge amount discharged from the main capacitor to an illuminant, by counting the number of pulses that have a role of allowing discharge, as well known in digital discharge.

Here, instead of how many times manual full lighting M1/1 can be performed, but for example, how many times manual lighting M1/2, M1/4, M1/16, or the like can be performed may be calculated. Furthermore, instead of how many times manual full lighting M1/1 can be performed, but for example, how many times manual full lighting M1/1, and manual lighting M1/2, M1/4, M1/16 and the like were already performed may be calculated.

First Embodiment

Next, an operation of the first embodiment (lighting apparatus) will be described, using a flow chart as shown in FIG. 1.

In step S1, a microcomputer sets the maximum number of lighting times Smax at manual lighting M1/1, and the number of pulses Pfull at manual full lighting M1/1, in accordance with the type of battery.

In step S2, the user sets a fully charged battery or an unused (new) battery in the lighting apparatus and turns on an electric source of the lighting apparatus. Thus, the user can specify the battery set in a battery box, for the lighting apparatus. When the user specifies the type of battery, the microcomputer of the lighting apparatus reads out from a recording medium the maximum number of lighting times Smax at manual lighting M1/1, and the number of pulses Pfull at manual full lighting M1/1, of the specified battery.

In step S3, when the user takes a picture, the number of pulses at each lighting is defined as Psin, the integrated value of the number of pulses at each lighting is defined as Pint, and the number of lighting times at manual full lighting M1/1 is defined as Sm1/1.

In step S4, the user takes a picture and causes the lighting apparatus to emit light, and then the microcomputer starts calculation to display a battery remaining content.

In step S5, the microcomputer calculates the sum of the number of pulses Psin at the lighting and an integrated value Pint of the number of pulses at each lighting, and updates the integrated value Pint (Pint=Pint+Psin).

In step S6, the microcomputer compares the integrated value Pint of the number of pulses with the number of pulses Pfull at manual full lighting M1/1. As the result of the comparison, if the integrated value Pint of the number of pulses is larger than Pfull, the process proceeds to step S7, and if the integrated value Pint of the number of pulses is smaller than Pfull, the process returns to step 4, and repeats the process of steps S4 to S6.

In step S7, the microcomputer adds one to a number of lighting times at manual full lighting M1/1 and updates the number of lighting times 5 m1/1.

In step S8, the microcomputer carries out the computation of (Pint=Pint−Pfull). Thus, the value of Pint is reduced into a value smaller than that of Pfull. The range of the integrated value Pint of the number of pulses is $0 \leqq \text{Pint} < \text{Pfull}$.

In step S9, the microcomputer converts a battery remaining content to a number of times capable of lighting at manual full lighting M1/1, displays it in a liquid crystal display or the like, and informs the user of it.

Next, the indication of a number of times capable of lighting as shown in step S9 will be described in detail. The microcomputer of the lighting apparatus compares the number of lighting times Sm1/1 at manual full lighting M1/1 with the maximum number of lighting times Smax at manual full lighting M1/1 by using the battery.

If the microcomputer carries out the computation of (Smax−Sm1/1), it may be calculated how many times manual full lighting M1/1 can still be performed. Furthermore, thus, how many times manual lighting M1/2 can still be performed, how many times manual lighting M1/4 can still be performed, and the like may be calculated. These can be appropriately displayed in the displaying section of the liquid crystal display or the like of the lighting apparatus.

Figure 2:
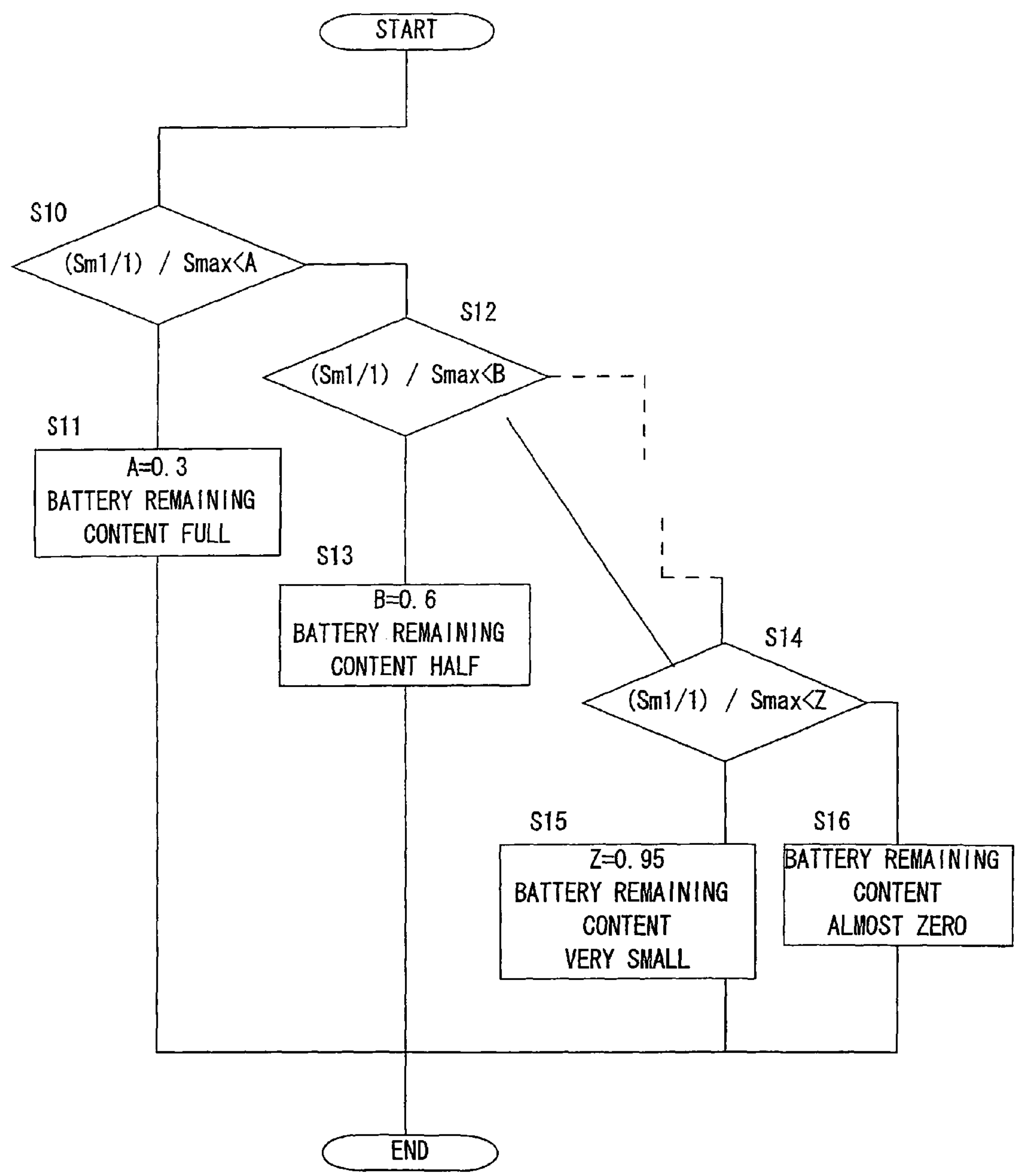
FIG. 2 is a flow chart showing a procedure that informs directly a user of a battery remaining content in the first embodiment.

FIG. 2 is a flow chart showing a procedure that informs directly the user of a battery remaining content.

In step S10, the microcomputer of the lighting apparatus compares the number of lighting times Sm1/1 at manual full lighting M1/1 with the maximum number of lighting times Smax at manual full lighting M1/1 by using the battery. Theoretically, the range of (Sm1/1)/Smax is $0<(Sm1/1)/Smax \leqq 1$.

In step S10 of FIG. 2, the microcomputer of the lighting apparatus determines whether or not (Sm1/1)/Smax is smaller than A.

In FIG. 2, the numeric values A, B, . . . , Z are numeric values in the same range as (Sm1/1)/Smax (that is, $0<A, B, \ldots, Z \leqq 1$), the latter the order of alphabetic characters are as expressed as A→B→ . . . →Y→Z, the larger the values are which alphabetic characters indicate.

Specifically, as shown in steps S10 and S11, when A=0.3, "battery remaining content FULL" is displayed, as shown in steps S12 and S13, when B=0.6, "battery remaining content HALF" is displayed, and as shown in steps S14 and S15, when Z=0.95, "battery remaining content VERY SMALL" or the like is displayed. Furthermore, "battery remaining content is ALMOST ZERO" or the like is displayed in step S16.

FIG. 2 shows an example that the battery remaining content is not displayed by a number of times capable of lighting but displayed as a battery remaining content.

Figure 3:
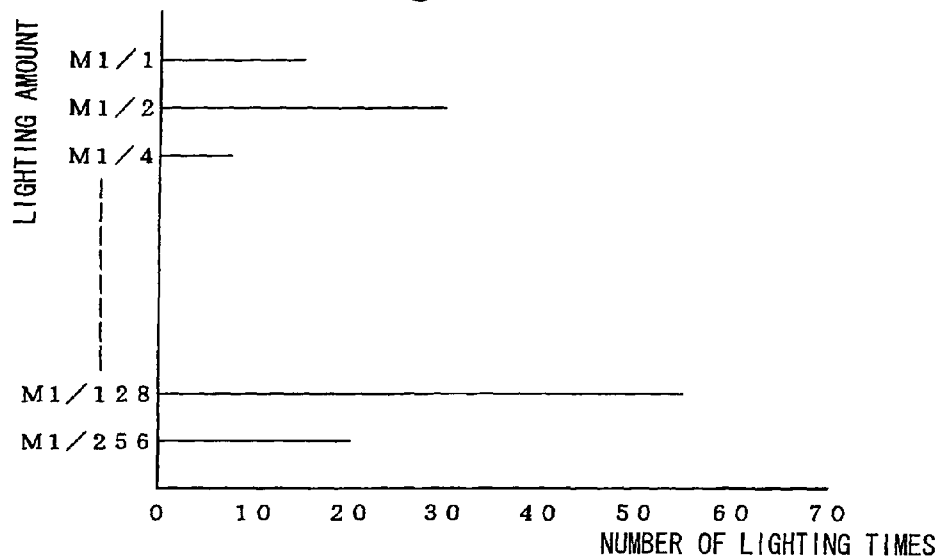
FIG. 3 is a view showing an example of a relationship between a lighting amount (longitudinal axis) and a number of lighting times (horizontal axis) in the first embodiment.

FIG. 3 is a view showing an example of the relationship between a lighting amount and a number of lighting times when the user causes the lighting apparatus to emit light when taking a picture. In FIG. 3, the longitudinal axis indicates a lighting amount and the horizontal axis indicates a number of lighting times. The user sees FIG. 3, and thereby can know user's own usage of the lighting apparatus. For example, a user frequently using lighting M1/1 or the like many times is necessary to prepare a spare battery, the lighting M1/1 being the lighting with the large lighting amount. Furthermore, a user frequently using lighting M1/128 or the like many times is not necessary to prepare a spare battery, the lighting M1/128 being the lighting with the small lighting amount.

Figure 4:
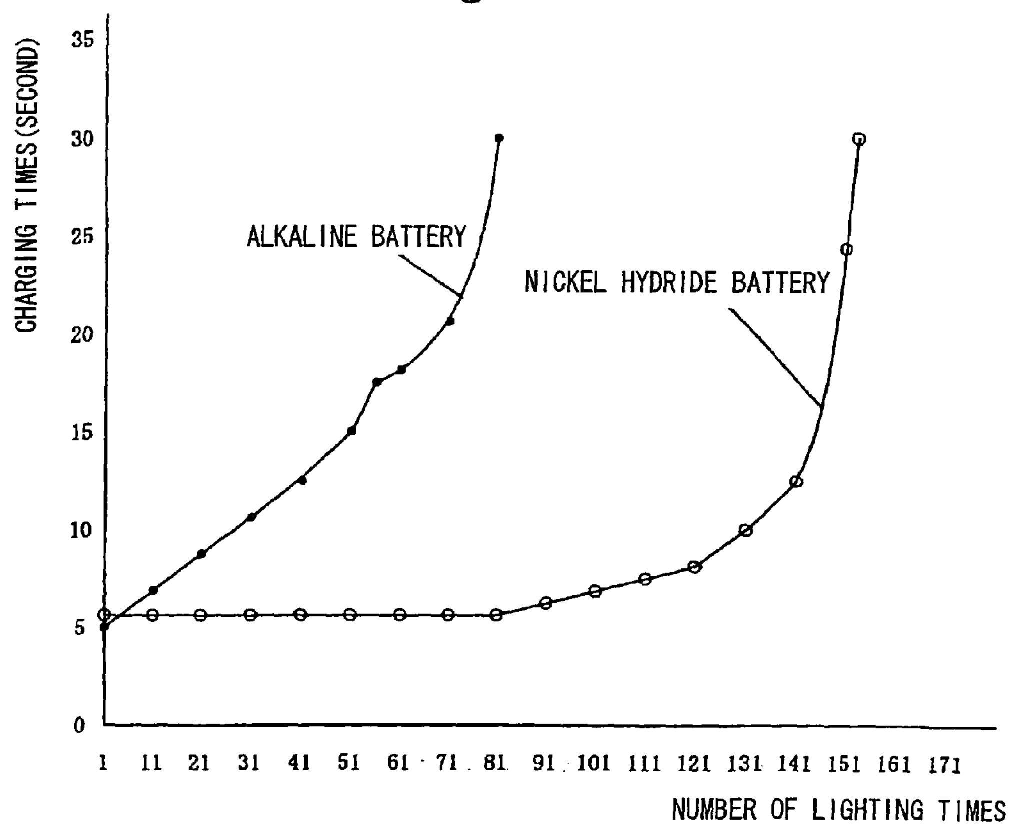
FIG. 4 is a view showing a relationship between charging times of alkaline battery and nickel hydride battery at manual full lighting M1/1 (longitudinal axis) and a number of lighting times (horizontal axis).

FIG. 4 is a view showing the relationship between charging times (longitudinal axis) of alkaline battery and nickel hydride battery at manual full lighting M1/1 and a number of lighting times (horizontal axis) thereof. As is obvious in FIG. 4, both of the alkaline battery and nickel hydride battery have characteristics in parabola shape in the relationship between the number of lighting times and the charging time. Therefore, for example, in a nickel hydride battery, unless the remaining lighting times become 20 to 30, a user can not know that the battery is likely to be used up. Therefore, if lighting is controlled by only the charging time, it is impossible to inform a user of battery remaining content information before the state in which the remaining lighting times become 20 to 30.

However, because a user does not perform manual full lighting M1/1 every time, the remaining voltage of the main capacitor differs for each of lighting methods. Therefore, it is impossible to control the battery remaining content by the charging time of the main capacitor. Furthermore, as shown in FIG. 4, a long charging time indicates that it becomes impossible to supply a sufficient charging current from a battery.

However, according to the first embodiment, in each type of battery (battery different in physical properties), a user can always recognize how many times lighting M1/1, M1/2, M1/4, or the like can be performed. Furthermore, a user can always recognize a battery remaining content in each type of battery (battery different in physical properties). Therefore, the present embodiment has a specific advantage that the battery used-up indication cannot achieve.

Second Embodiment

Figure 5:
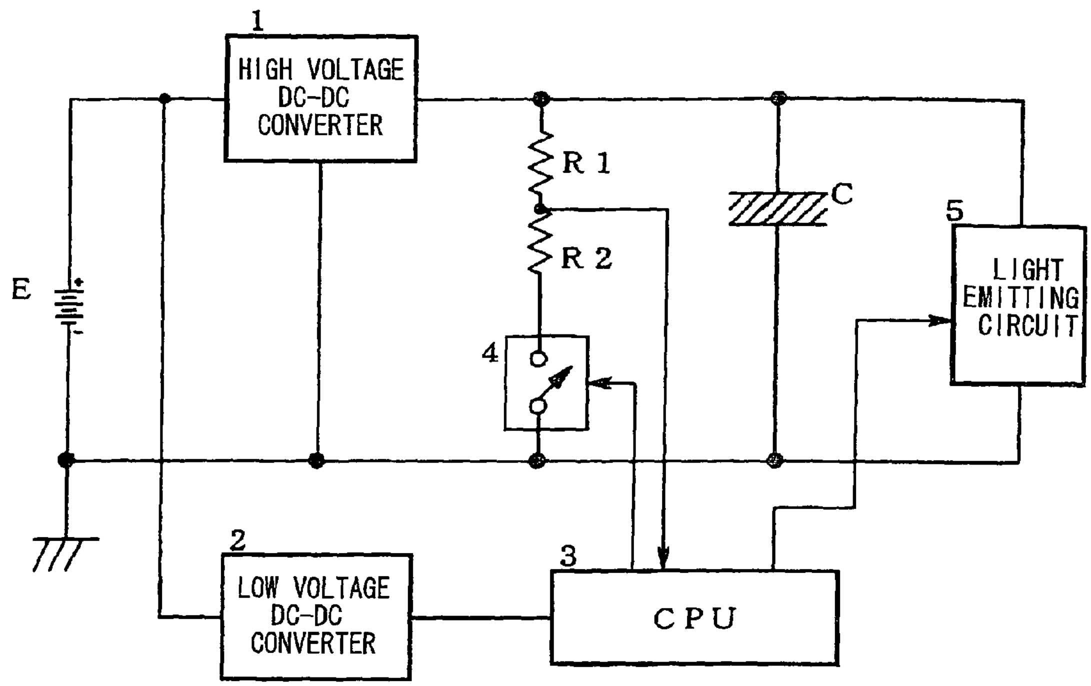
FIG. 5 is a circuit diagram showing a second embodiment.

FIG. 5 is a circuit diagram showing the second embodiment. In FIG. 5, E is an electric source, reference numeral 1 is a high voltage DC-DC converter, 2; a low voltage DC-DC converter, 3; a CPU, 4; a switching circuit, 5; a light emitting circuit, R1 and R2 are resistors and C is a main capacitor.

In FIG. 5, the low voltage DC-DC converter 2 supplies an operation voltage to the CPU. Furthermore, the high voltage DC-DC converter 1 stores a charge in the main capacitor C. When the switch circuit 4 is turned on, the charge storage to the capacitor C starts and the voltage of the capacitor C increases. It is possible to easily grasp the voltage of the capacitor C, because the CPU 3 monitors the divided voltage value of the resisters R1 and R2.

Figure 6:
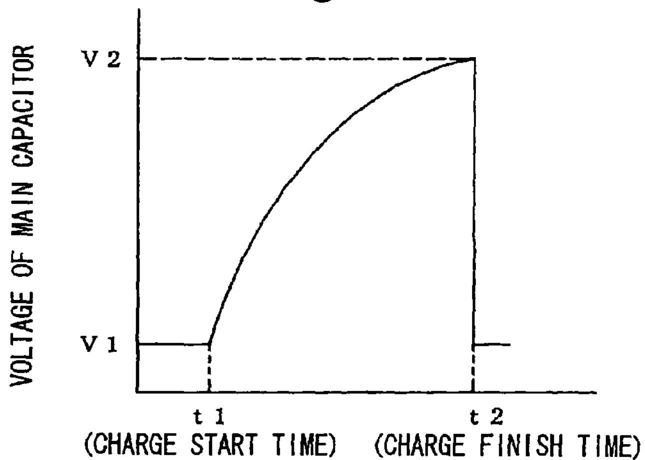
FIG. 6 is a view showing a charging state of a main capacitor.

Namely, as shown in FIG. 6, suppose that the voltage of the main capacitor C is a voltage V1 at charge start time (t1) and is a voltage V2 at charge finish time (t2). At this time, the charge amount Qn that is charged in the main capacitor C is $Qn=C\,(V2-V1)=C\cdot\Delta Vn$.

Furthermore, if the charge amount discharged from the main capacitor C (used charge amount) when manual full lighting M1/1 is performed is QM1/1, $QM1/1=C\cdot\Delta V_{M1/1}$. Here, $\Delta V_{M1/1}$ is the maximum voltage difference (V2−V1) that can be discharged.

At this time, if the number of times during which a battery in a fully charged state can perform manual full lighting M1/1 is N, the charge amount the battery in the fully charged state stores is $N\cdot C\cdot\Delta V_{M1/1}$.

The charge amount Qn to be used by one lighting, because a voltage of the main capacitor C decreases from V2 to V1, is $Qn=C\,(V2-V1)=C\cdot\Delta Vn$.

The total charge amount to be used when a lighting apparatus emits light n times is $\Delta Q1+\Delta Q2+\ldots+\Delta Qn=C\cdot(\Delta V1+\Delta V2+\ldots+\Delta Vn)$. Here, the lighting amount $\Delta Q1$ (i=1, 2, . . . , n) differs for each lighting, the total charge amount is discharged from a fully charged battery.

Therefore, the number of times m during which a battery can perform manual full lighting M1/1 is $m=[N\cdot C\cdot\Delta V_{M1/1}-C\cdot(\Delta Q1+\Delta Q2+\ldots+\Delta Qn)]/C\cdot\Delta V_{M1/1}=[N\cdot\Delta V_{M1/1}-(\Delta Q1+\Delta Q2+\ldots+\Delta Qn)]/\Delta V_{M1/1}$.

Incidentally, when a lighting apparatus performs not full lighting, but manual lighting M1/2, 1/4, or the like (hereinafter, referred to as 1/X lighting, X=2, 4 . . . ), "$\Delta V_{M1/1}$" according to the denominator of the equation is replaced with "$\Delta V_{M1/X}$". Here, $\Delta V_{M1/X}=\Delta V_{M1/1}/X$.

As is obvious from the above description, according to the second embodiment, it is possible to obtain the number of lighting times corresponding to a lighting amount, based on a battery remaining content, and to display for a user the remaining lighting times corresponding to the lighting amount.

Example of Display to an LCD

Figure 7A:
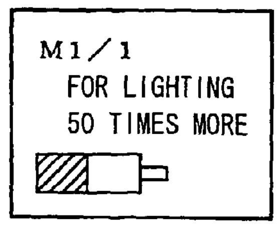
FIGS. 7*a* and 7*b* are views showing a first example of battery remaining content indication.
Figure 7B:
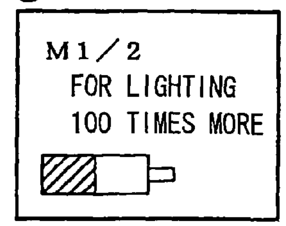

FIG. 7*a* is a view showing the first example of the battery remaining content indication when manual full lighting M1/1 is performed, and FIG. 7*b* is a view showing the first example of the battery remaining content indication when manual lighting M1/2 is performed.

Figure 8A:
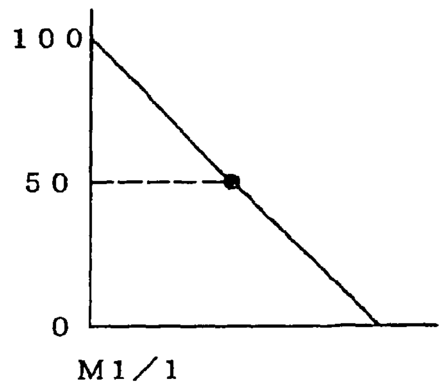
FIGS. 8*a* and 8*b* are views showing a second example of battery remaining content indication.
Figure 8B:
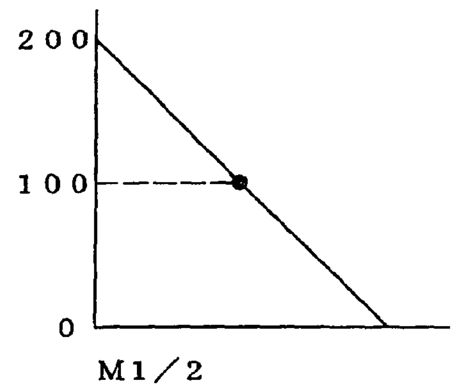

FIG. 8*a* is a view showing the second example of the battery remaining content indication when manual full lighting M1/1 is performed, and FIG. 8*b* is a view showing the second example of the battery remaining content indication when manual lighting M1/2 is performed.

Figure 9A:
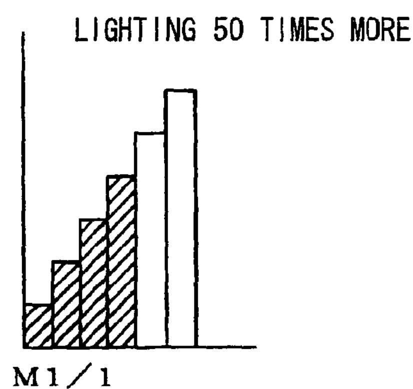
FIGS. 9*a* and 9*b* are views showing a third example of battery remaining content indication.
Figure 9B:
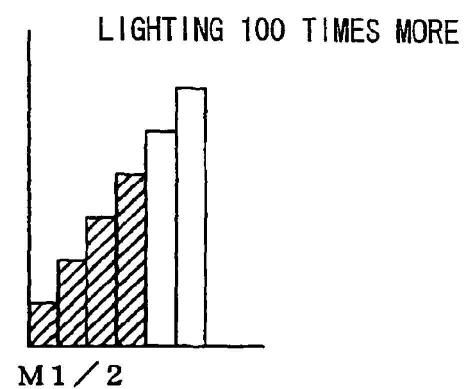

FIG. 9*a* is a view showing the third example of the battery remaining content indication when manual full lighting M1/1 is performed, and FIG. 9*b* is a view showing the third example of the battery remaining content indication when manual lighting M1/2 is performed.

Incidentally, although the above description has described the case where the present embodiment is applied to a lighting apparatus of a camera, the present embodiment is not limited to this, but can be applied broadly to a general electronic device. Namely, in each of multiple types of batteries different in physical properties, it is possible to convert a battery remaining content of an electronic device to a used charge amount of a single reference operation of the device, and displays the remaining executing times of reference operation, and to inform a user of the remaining battery content.

Third Embodiment

FIG. 10 shows conceptually a block diagram of a lighting apparatus according to the third embodiment. In this figure, a lighting apparatus 1000 includes an electric source loading section 1010 into which a battery is inserted as an electric source. By the instruction of a CPU 1002, for example, a battery voltage of approximately 6 V increases up to 330 V in a voltage boosting section 1011, and a current of approximately 20 A, for example, is supplied for a few seconds to a charging section 1012 made up of the main capacitor and the like for charging. In a normal battery, a current value to finish in one hour the discharge of a battery cell with a nominal content value, as 1C discharge is used as performance indicator, and this value is approximately 3 A for a charging battery of 2600 mAh, for example. Therefore, in the lighting apparatus such as this embodiment, although the battery use is anomalous, the embodiment has a configuration in which it is possible to grasp a used electric quantity even by using a general-purpose dry battery or the like that does not include a current measuring IC. Furthermore, the voltage boosting section 1011 includes a transformer, a switching element such as FET and transistor, and the like.

A charge charged into the charging section 1012 is supplied to a light emitting section 1007, by a predetermined lighting amount corresponding to a first lighting mode, in the first lighting mode that is input and set in an operation input section 1008, prior to lighting, by instruction of a lighting controlling section 1014, and is consumed for lighting.

At this time, a lighting amount detecting section 1006 including a photodiode and the like detects a lighting amount of the light emitting section 1007, performs photoelectric conversion, and outputs it to the CPU 1002 as a pulse signal per predetermined charge amount. Thus, a lighting amount is detected quantitatively as a pulse number. Furthermore, a pulse counting section 1013 calculates and counts a pulse input from the lighting amount detecting section 1006. Furthermore, the lighting controlling section 1014 compares the number of pulses corresponding to the first lighting mode which is recorded in a memory section 1003 prior to lighting in advance, with the pulse counting number of, in the pulse counting section 1013, pulses input from the lighting amount detecting section 1006, and performs control to stop lighting of the light emitting section 1007 at the point when both coincide with each other.

Namely, the lighting amount of the light emitting section 1007 is controlled by performing the feedback control where the lighting controlling section 1014 compares the number of pulses that are related to a lighting mode and stored in the memory section 1003 in advance, with a calculated value of, in the pulse counting section 1013, pulses detected in the lighting amount detecting section 1006.

Furthermore, the memory section 1003 includes a flash memory 1017, a RAM 1016, a ROM 1018 and the like. The memory section 1003 records in advance a plurality of lighting modes and the number of pulses providing the lighting amount that corresponds to those modes while corresponding to each other. This record data may be a reference table format and may be rewritable by firmware update of maintenance or the like.

On the other hand, a holding amount of electric current computing section 1005 calculates a holding electric current after the electric source of the lighting apparatus 1000 is turned on. The holding electric current is approximately determined in advance as a apparatus inherent value for each lighting apparatus and in addition, in accordance with display status in a displaying section 1009 made up of liquid crystal and the like. Therefore, the holding amount of electric current computing section 1005 calculates a product of time which is obtained from a timer the CPU 1002 includes and which passes from when the electric source is turned on, and a holding electric current per unit time, and thereby calculating the total amount of charge consumed by the holding electric current. Furthermore, the holding amount of electric current computing section 1005 uses the correlation data between a pulse number that is stored in advance in the memory section 1003 and a charge amount corresponding to that pulse number, and thereby compute the total amount of holding electric current by converting it to a pulse number.

Thus, the CPU 1002 can calculate the consumed charge amount of the lighting apparatus 1000 as the number of pulses, by the sum of the number of pulses corresponding to a charge consumed by lighting of the light emitting section 1007, and the number of pulses converted corresponding to the holding amount of electric current. That is, after the electric source is turned on, a pulse calculating section 1015 adds the number of pulses Psin corresponding to a consumed charge amount by one lighting, and the pulse calculating value P(Iint) of a holding electric current, and obtains the total consumed charge amount of the lighting apparatus 1000 by the number of pulses. Thus, it is possible to grasp a used electric quantity even without newly providing an ampere meter or an IC for current measurement on a battery as electric source, the periphery thereof, and the like.

There may be a configuration in which this summed pulse number can once be stored in a non-volatile memory or the like of the memory section 1003 by instruction of the CPU 1002 when the electric source is turned off, and can be read out when the electric source is next turned on. Furthermore, there may be a configuration in which it is stored in the pulse calculating section 1015. Thus, in spite of the on or off state of the electric source, the pulse calculating section 1015 can continuously calculate the consumed charge amount.

Furthermore, a removable detecting section 1004 detects whether or not a new battery is loaded in an electric source loading section 1010. Thereafter, if the removable detecting section 1004 detects new battery loading, it outputs a reset signal to the CPU 1002, resets the pulse calculating value (Pint) to be stored in the pulse calculating section 1015 or the memory section 1003, and makes it initial state (Pint=0).

Therefore, the pulse number calculated in the pulse calculating section 1015 continuously calculates a consumed charge amount of a battery currently loaded, as long as the battery is not replaced. Thus, it is possible to accurately compute and grasp a consumed charge amount from when the battery is loaded.

Furthermore, it is possible to display a used charge amount to be calculated in the pulse calculating section 1015, in the displaying section 1009, by the instruction of the CPU 1002. Therefore, an operator of the lighting apparatus 1000 can know a charge amount of a battery currently used by the displaying section 1009. Furthermore, as the display mode, the total calculated number of pluses may be displayed as it is. Furthermore, when the total usable charge amount of used battery is set in advance by an initial content of electric source setting section 1021 or is recorded in the memory section 1003, by obtaining the difference between it and a used charge amount the CPU 1002 may calculate and display a remaining electric source content. Even in this case, a usable initial charge amount when a battery is loaded is set in advance as a converted pulse number in the initial content of electric source setting section 1021, or is recorded in the memory section 1003, and thereby it is possible to calculate a remaining electric source content as the pulse number corresponding thereto.

In a lighting mode setting section 1020, an operator of the lighting apparatus 1000 can optionally set a lighting amount that is emitted in the light emitting section 1007, and a lighting amount corresponding to an indicator when displaying a remaining electric source content and the like as a remaining number of lighting times in the displaying section 1009.

Figure 11:
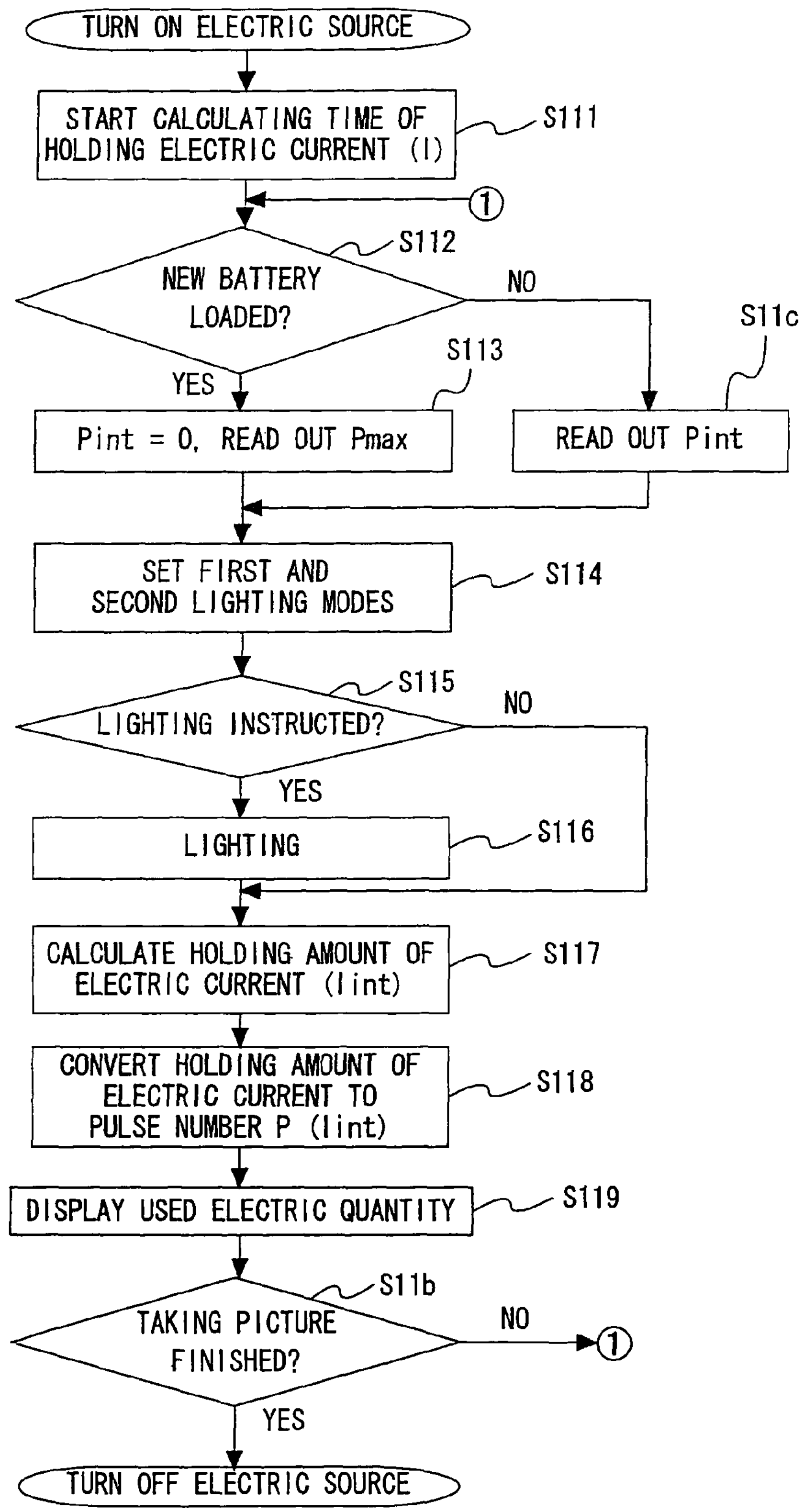
FIG. 11 is a calculation display flow conceptual diagram of the lighting apparatus.

Next, an operation flow of the present embodiment will be described, by using a calculation display flow conceptual diagram of a lighting apparatus as shown in FIG. 11. (Step 111) If the electric source of the lighting apparatus 1000 is turned on, the CPU 1002 starts measurement of standby time. This standby time includes both of the time during which a lighting operation is not performed and the time during which a lighting operation is performed. That is, the CPU 1002 counts all the time from when the electric source is turned on.

(Step 112) The CPU 1002 judges whether or not a new battery loading is detected in the removable detecting section 1004. If it is detected, the process proceeds to step 113, and if it is not detected, the process proceeds to step 11*c*.

(Step 113) The pulse calculating value so far is initialized. That is, the CPU 1002 initializes the Pint the memory section 1003 stores or the Pint the pulse calculating section 1015 stores into Pint=0. Furthermore, the pulse number Pmax corresponding to an initial usable charge content of a battery loaded newly in the electric source loading section 1010 is read out from the memory section 1003. There may be a configuration in which Pmax is set from the initial content of electric source setting section 1021 of the operation input section 1008.

(Step 114) The first lighting mode for instructing a lighting amount of the light emitting section 1007 is set from the lighting mode setting section 1020 of the operation input section 1008. Furthermore, the second lighting mode that is used when displaying a remaining electric source content and the like in the displaying section 1009 is set from the lighting mode setting section 1020 of the operation input section 1008.

The lighting modes include, as described above, a manual lighting mode such as M1/1, M1/2, M1/4, M1/($2^n$: n is an integer number), or the like, a light-control lighting mode, and the like. The light-control lighting mode is a mode that changes according to a subject a lighting amount of the light emitting section 1007 and emits light so that an amount of light reflected from the subject, of light emitted from the light emitting section 1007 may be a set value. In the light-control lighting modes, there are lighting modes such as preparative lighting light-control mode, real time light-control mode, and the like.

In the real time light-control mode, the CPU 1002 receives in a light-control light receiving sensor (not shown) an amount of light reflected from a subject, of an illumination light emitted in a real lighting (lighting at picture taking) of the light emitting section 1007. The CPU 1002 outputs a lighting stop signal to the light emitting section 1007 to stop the lighting, when the amount of light reflected from the subject which the light-control light receiving sensor receives becomes a predetermined value. Incidentally, in the real time light-control mode, there are a known TTL light-control mode in which light reflected from the subject which the light-control light receiving sensor receives passes through an imaging lens used for imaging, a known external light-control mode in which light reflected from the subject which the light-control light receiving sensor receives does not pass through the imaging lens used for imaging, and the like.

In the preparative lighting light-control mode, the CPU 1002 receives in the light-control light receiving sensor (not shown) an amount of preparative lighting reflected light from the subject, of an illuminating light emitted in the preparative lighting performed before a real lighting of the emitting section 1007. The CPU 1002 determines a lighting amount at a real lighting, based on the amount of preparative lighting reflected light from the subject that is received in the light-control light receiving sensor, and sets a pulse number corresponding to the lighting amount.

In the first lighting mode, it is possible to set a manual lighting mode and a light-control lighting mode. The lighting mode settable in the second lighting mode is a manual lighting mode. The memory section 1003 records in advance a lighting amount that corresponds to each manual lighting mode as the number of pulses.

(Step 115) Whether or not lighting is instructed by an operation of release or the like of the imaging device is determined, and if the emission is instructed, the process proceeds to the next step and lighting is performed.

(Step 116) The light emitting section 1007 emits light in the lighting mode set in the first lighting mode in timed relationship with release timing and the like of the imaging device. When a real time light-control mode is set in the first lighting mode, the CPU 1002 continues lighting by the light emitting section 1007 until it receives a lighting stop signal, and stops lighting on receiving the lighting stop signal. The pulse calculating section 1015 adds the pulse count number Psin that the pulse counting section 1013 counts from lighting start to lighting stop by the lighting stop signal, to the calculated pulse number Pint. The added calculated pulse number Pint is stored in the pulse counting section 1003 and pulse calculating section 1015.

When a preparative lighting light-control mode is set in the first lighting mode, the CPU 1002 continues lighting until the pulse count number Psin counted by the pulse counting section 1003 becomes the predetermined pulse number corresponding to a lighting amount at a real lighting that is determined at the preparative lighting, and stops lighting when the pulse count number Psin becomes the predetermined pulse number. When lighting stops, the pulse calculating section 1015 adds the pulse count number Psin that the pulse counting section 1013 counts or the predetermined pulse number Psin corresponding to a lighting amount that is determined at a preparative lighting, to the integrated pulse number Pint. The summed calculated pulse number Pint is stored in the memory section 1003 or the pulse calculating section 1015.

When a manual lighting mode is set in the first lighting mode, the CPU 1002 continues lighting until the pulse count number counted by the pulse counting section 1003 becomes the predetermined pulse number corresponding to the set manual lighting mode, and stops lighting when the pulse count number Psin becomes the predetermined pulse number. When lighting stops, the pulse calculating section 1015 adds the pulse count number Psin that the pulse counting section 1013 counts or the predetermined pulse number corresponding to a set manual lighting mode, to the calculated pulse number Pint. The summed calculated pulse number Pint is stored in the memory section 1003 or the pulse calculating section 1015.

(Step 117) The holding amount of electric current computing section 1005 calculates the holding electric current (lint) by using the elapsed time after the electric source is turned on by the clock timer of the CPU 1002 and a holding electric current amount per unit time that is recorded in the memory section 1003. That is, the holding electric current (lint) is a time integration value of all the holding electric current from when the electric source is turned on up to now. Here, the timer of the CPU 1002 is reset, and counting of the elapsed time of a holding electric current during the next certain period is started.

(Step 118) The holding electric current (Iint) calculated in step 117 is converted into the number of pulses P (Iint), and the converted pulse number P (Iint) is added to Pint. The summed calculated pulse number Pint is recorded in the memory section 1003 or the pulse calculating section 1015. The memory section 1003 records in advance the relationship between a holding electric current and the pulse number corresponding thereto. Fundamentally, with respect to pulse, because a given charge amount corresponding to one pulse is known, the correlation between a holding electric current amount corresponding to this charge amount and it is recorded in the memory section 1003. This correlation may be recorded as a holding electric current amount corresponding to one pulse, and may be recorded as the elapsed time of the holding electric current that uses a charge corresponding to one pulse.

(Step 119) The CPU 1002 calculates a used electric quantity based on the calculated pulse number Pint. Furthermore, the CPU 1002 displays the calculated used electric quantity in the displaying section 1009. The used electric quantity is calculated by the pulse number Pint calculated after the battery is loaded.

The CPU 1002 calculates the difference between an initial electric source content of a battery that is set in the initial content of electric source setting section 1021 when a battery is loaded and a used electric quantity, and thereby the display in the displaying section 1009 may be displayed as a remaining electric source content. The displaying section 1009 can display the remaining electric source content as a remaining number of times capable of lighting by a lighting amount that corresponds to the second lighting mode.

Furthermore, as a display format of the displaying section 1009, it is possible to display the pulse number as it is, display the pulse number by converting it to the remaining number of times capable of lighting that corresponds to the second lighting mode, and display the pulse number by converting it to the number of spent lighting times that corresponds to the first or second lighting mode. In addition, the display format of the displaying section 1009 may use one that can viscerally grasp a remaining electric source content, and may use one that uses any of analog display, digital display, or the like.

Furthermore, the displaying section 1009 may have a configuration that uses an apparatus for various displays such as a liquid crystal display (LCD), and in addition organic EL display, inorganic EL display, plasma display, SED, LED display, or the like.

(Step 11*b*) Whether taking a picture is finished or not is judged. If taking a picture is finished, the electric source is turned off. If taking a picture is not finished, the process returns to step 112, and executes these steps 112 to 11*b*. Incidentally, if taking a picture is continuously repeated, as long as the various settings of step 114 or the like are not necessary to change because the settings have already been finished, those may be omitted.

(Step 11*c*) Unless a new battery is loaded, the pulse calculation corresponding to a used electric quantity of a currently continuously loaded battery is performed. On this account, the read out process of the previously recorded Pint that the memory section 1003 or the pulse calculating section 1015 stores is performed.

Incidentally, in this embodiment, a sensor that detects the presence or absence of a loaded battery may configure the removable detecting section 1004. Furthermore, an open/close sensor of a lid and cap of the electric source loading section 1010 may configure the removable detecting section 1004. Furthermore, a signal for resetting the calculated pulse number of the pulse calculating section 1015 and the like that uses as trigger a detection signal output from the removable detecting section 1004 may be input from the operation input section 1008. In this case, there may be a configuration in which the CPU 1002 resets the calculated pulse number by using as trigger the setting operation of an initial electric source content in the initial content of electric source setting section 1021.

Furthermore, there may be a configuration in which a part or all of the calculation function the CPU 1002 has may be replaced by or may cooperate with that of another calculating device of ASIC or the like. Furthermore, the memory section 1003 may be a configuration that includes a RAM 1016, a ROM 1018, a flash memory 1017, and in addition a register, EEPROM, SRAM, and the like.

As described above, the CPU 1002 records the calculated pulse number Pint corresponding to a used electric quantity in the memory section 1003 or the pulse calculating section 1015. Thus, it is possible to continuously calculate the calculated pulse number Pint corresponding to the used electric quantity, by reading out the calculated pulse number Pint corresponding to the used electric quantity recorded, when the electric source is next turned on, even if the electric source is turned off. Namely, the calculated pulse number Pint corresponding to the used electric quantity is calculated as the calculated pulse number Pint corresponding to the total used electric quantity from when the electric source is loaded until the removable detecting section 1004 detects new battery loading. Consequently, it is possible to considerably accurately indicate how many times a loaded battery is still usable.

It is preferable that the memory section 1003 records the pulse number Pmax corresponding to an electric source content of each battery as a reference data, or the like, because a loaded battery differs in the pulse number Pmax corresponding to the electric source content by the types. Furthermore, if a rechargeable battery is used as electric source, because it is anticipated that the battery deteriorates due to the number of charging times or use times of the battery, the memory section 1003 may record as data table or the like the degradation function of the full electric source content that depends on the number of charging times, or the like. Thus, a number of previous used times of the rechargeable battery is input, and thereby it is possible to accurately grasp a remaining electric source content based on a more accurate full electric source content. Furthermore, if a usable electric source content of the battery is known when the battery is loaded, it is possible to set it in the initial content of electric source setting section Furthermore, a lighting apparatus for an imaging device according to this includes: a light emitting section which illuminates a subject; an electric source loading section which loads a detachable electric source supplying electric power in order that the light emitting section may emit light; a lighting amount detecting section which detects a lighting amount of the light emitting section and converts it to a pulse number; a pulse calculating section that calculates and stores the pulse number that was converted by the lighting amount detecting section; a calculation section which calculates a used electric quantity based on a pulse calculating value that was calculated by the pulse calculating section; and a displaying section displaying the calculated used electric quantity.

The light emitting section can include preferably a xenon tube, irradiate instantaneously the subject during a release period of the imaging device, and output a sufficient light amount for imaging. A lighting controlling section controls the light emitting section. The lighting controlling section includes a switching element (IGBT) or the like. The lighting controlling section may include a CPU. The light emitting section can emit light by lighting instruction of the CPU, and stop lighting by lighting stop instruction of the CPU. Furthermore, an electric source section includes a rechargeable battery that is preferably a battery such as a size AA battery, CR123 battery, or the like. Furthermore, the electric source is not limited to the size, the content, and the like, and can use various types of batteries if loadable on the electric source loading section.

Incidentally, in the above description, although the pulse number corresponding to a lighting amount of lighting in accordance with release timing is added to the calculated pulse number Pint, if the lighting from the light emitting section of the lighting apparatus is used, even any lighting may be added to the calculated pulse number Pint. For example, when a lighting apparatus having a test lighting mode is used, according to an operation of an operation member that instructs the test lighting, even in this lighting, in a similar manner to the above lighting in accordance with release timing, or the like, the pulse number counted corresponding to the test lighting in the pulse counting section 1013 is also added to the calculated pulse number Pint.

In this case, in step 115 of FIG. 11, it is detected that a test lighting was instructed. Next, in step 116, the CPU 1002 continues lighting until the pulse count number Psin counted by the pulse counting section 1003 becomes the predetermined pulse number corresponding to a lighting amount that is set in the test lighting, and stops the lighting when the pulse count number Psin becomes the predetermined pulse number. When lighting stops, the pulse calculating section 1015 adds the pulse count number Psin counted by the pulse counting section 1013 or the predetermined pulse number corresponding to a lighting amount that is set in the test lighting to the calculated pulse number Pint. The summed calculated pulse number Pint is recorded in the memory section 1003 or the pulse calculating section 1015.

Furthermore, for example, as represented by a single lens reflex camera, it is preferable that the lighting apparatus is configured separately from a camera. Since this lighting apparatus is used together with an imaging device such as camera, it is preferable that the turn-on timing and turn-off timing of the light emitting section are associated with the release and shutter of a camera. However, it is preferable that the electric source according to the consumed power of the lighting apparatus is provided separately from the imaging device, and the consumed power of the lighting apparatus is supplied from the electric source of the lighting apparatus.

Furthermore, preferably, in the lighting apparatus for the imaging device according to this embodiment, the lighting apparatus includes an initial content of electric source setting section that sets an electric source content when loading an electric source in the electric source loading section, wherein the electric source is a fully charged nickel-hydride battery, unused lithium-ion battery, unused manganese battery, or unused alkaline battery; an initial battery content corresponding to a battery is set in the initial content of electric source setting section; the CPU calculates a remaining electric source content of the electric source based on the initial battery content set in the initial content of electric source setting section and a used electric quantity; and the displaying section displays the used electric quantity and the remaining electric source content.

Here, a battery used in the electric source is preferably a fully charged battery or an unused battery. Thus, it is possible to accurately grasp an initial usable charge amount and set it in the initial content of electric source setting section. However, if a rechargeable battery is used, it is anticipated that the battery deteriorates along with the number of discharging and charging times, and it is anticipated that the usable battery content decreases along with the deterioration even if the battery is fully charged. Thus, it is preferable that an actually usable battery content is set or is adjustable, aligned with deterioration characteristic of the rechargeable battery in the initial content of electric source setting section.

Furthermore, when a displaying section displays a used electric quantity, an operator of the lighting apparatus can confirm the used quantity of a battery by the display, which is preferable. Furthermore, when the remaining content of a battery is displayed as a remainder of electric source content, because it is possible to confirm by the display how many times the battery can still be used, it is possible to indicate the preparation of battery replacement, which is further preferable.

Furthermore, more preferably, in the lighting apparatus for the imaging device according to this embodiment the lighting apparatus includes a lighting mode setting section that sets a lighting mode of a light emitting section, and a memory section that records in advance the pulse number corresponding to a lighting amount of a manual lighting mode, wherein the CPU converts a used electric quantity or a remaining electric source content to a number of lighting times in the manual lighting mode, and the displaying section displays the number of lighting times that was converted by the CPU.

Thus, the displaying section displays the number of lighting times corresponding to a lighting amount of manual lighting, thus an operator of the lighting apparatus may easily confirm used electric quantity and usable electric quantity. The lighting mode may be the one that expresses a lighting amount by fractional number of, for example, M1/1, N1/2, M1/4, and the like that corresponds to manual full lighting.

Furthermore, the lighting mode may be a mode corresponding to shooting scene and a mode which indicates various shooting environments of, for example, indoors, outdoors, fine weather, clouding, night, backlight photographing, and the like. Furthermore, preferably, in the lighting apparatus for the imaging device according to this embodiment, the lighting apparatus includes a lighting mode setting section for setting the first lighting mode in which lighting is performed in the light emitting section or the second lighting mode that is used for calculation of a number of lighting times that is displayed in the displaying section, the memory section that records in advance the pulse number corresponding to a lighting amount of a lighting mode, wherein the CPU converts a used electric quantity or a remaining electric source content to a number of lighting times in the second lighting mode that is set in the lighting mode setting section, and the displaying section displays the number of lighting times that was converted by the CPU.

Thus, it is possible to set a lighting amount that is used for calculation of the number of lighting times that the displaying section displays, separately from a lighting amount when actually causing the light emitting section to emit light. Incidentally, when the manual lighting mode is set in the first lighting mode, there may be a configuration in which a lighting mode set in the first lighting mode is set automatically as the second lighting mode.

Furthermore, when performing calculation of a used electric quantity as the pulse number, it is possible to obtain the total number of lighting times in the manual lighting mode that is set for display, by dividing the calculated pulse number Pint by the predetermined pulse number of the second setting mode. For example, when M1/2 is set as the first setting mode and M1/1 is set as the second setting mode, in the lighting at actual shooting, the light emitting section emits light by a lighting amount of M1/2, and the displaying section displays the number of lighting times when lighting is performed by a lighting amount of M1/1. Therefore, it is preferable, because the degree of freedom of shooting of an operator and of display is improved.

Furthermore, when performing calculation of a remaining electric source content as the pulse number, it is possible to obtain a remaining number of lighting times in the pulse number that is set for display, by dividing that pulse number by the pulse number of the second set mode. For example, when M1/4 is set as the first set mode and M1/8 is set as the second setting mode, in the lighting at actual shooting, the light emitting section emits light by a lighting amount of M1/4, and the displaying section displays the remaining number of times capable of lighting when lighting is performed by a lighting amount of M1/8. In this case, the remaining number of times capable of lighting when lighting is performed by a lighting amount of M1/4 may be displayed. Since the pulse number corresponding to M1/4 is approximately twice as large as the pulse number corresponding to M1/8, the remaining number of times capable of lighting when lighting is performed by a lighting amount of M1/4 is approximately half as large as that of M1/8. Therefore, the degree of freedom of shooting of an operator and of display is improved, the operator can easily grasp a remaining content as guide of battery replacement, and it is preferable. In the displaying section 1009, by optional indication that an operator of a lighting apparatus specifies, it is possible to quantitatively display a used electric quantity and a remaining electric source content. Furthermore, it is possible to customize this display method.

Furthermore, in the lighting apparatus for the imaging device according to this embodiment, more preferably, the lighting apparatus includes a holding amount of electric current computing section that computes the holding electric current amount lint of the lighting apparatus and converts it to the pulse number P(Iint), wherein a pulse calculating section calculates together the pulse number Psin that was converted by a lighting amount detecting section or a predetermined pulse number, and the pulse number P(lint) that was converted by the holding amount of electric current computing section.

Thus, an operator of the lighting apparatus can more accurately grasp a used electric quantity or a remaining battery content, or the like, and it is preferable. Generally, a lighting apparatus uses and consumes electric power in a backlight for display and drive circuit, of a liquid crystal display section or the like, a storage device, a CPU, and the like, even in the time other than illuminating time. Although this power consumption is always caused in some form during when an electric source is turned on, the magnitude of the consumption amount differs from lighting apparatus to lighting apparatus, and furthermore differs subtly even by a driving program of the lighting apparatus or shooting environment. Here, since an inherent holding electric current is mainly approximately determined for each lighting apparatus, it is also possible to estimate in advance a used electric quantity by a holding electric current per unit time.

Furthermore, in the lighting apparatus for the imaging device according to this embodiment more preferably, the holding amount of electric current computing section computes an amount of holding electric current by the product of a period during which the holding electric current flows and an amount of holding electric current per unit time that is stored in advance in the memory section, and converts it to a pulse number.

Since it is possible to estimate in advance an amount of holding electric current per unit time as the inherent value of the lighting apparatus, it is possible to compute an accurate a used battery content. Consequently, it also is possible to accurately compute a usable remaining battery content. Furthermore, properly, the magnitude of holding electric current depends on to some extent turning-on or turning-off of a liquid crystal display back light, ready LED, and the like. Therefore, by storing in advance the holding electric currents of two modes, per unit time by whether the liquid crystal display back light and the like are turned-on or turned-off, it is preferable to calculate for each mode.

For example, when liquid crystal display back light and the like are turned-off, the holding electric current is 2 mA, and when liquid crystal display back light and the like are turned-on, the holding electric current is 20 mA or the like. By separately counting the standby time when liquid crystal display back light are turning-on and turning-off, and calculating each of the time, the accurate total amount of holding electric current is calculated, which serves as the indicator of a remaining electric source content. Thus, it is also possible to know a more accurate used battery content and remaining electric source content.

Furthermore, in the lighting apparatus for the imaging device according to this embodiment, more preferably, the lighting apparatus includes an operation section that inputs a reset signal of resetting the calculated pulse number Pint that the pulse calculating section or the memory section stores, and a removable detecting section that detects mounting/dismounting of the electric source, wherein the calculated pulse number Pint of the pulse calculating section or the memory section is reset by inputting of a reset signal from the operation section or by electric source mounting/dismounting detection of the removable detecting section.

Thus, from when a new battery or fully charged battery is loaded, it is possible to integrate and grasp the consumed electric power and the like of the battery. Furthermore, it is possible to calculate and grasp the used electric quantity and the like of the battery from an arbitrary timing. In this case, there may be a configuration in which a plurality of pulse calculating sections is provided, and the operation section that inputs a reset signal resetting separately for each of a plurality of pulse calculating sections. Furthermore, the reset signal of the removable detecting section may reset simultaneously all the pulse calculating sections. Thus, an operator can also grasp a used electric quantity and the like of a battery for each shooting scene in a plurality of shooting scenes.

For example, if there are provided three pulse calculating sections, those may be a pulse calculating section that calculates a pulse from when initial loading of a battery is performs, a pulse calculating section that calculates a pulse in the first shooting scene, and a pulse calculating section that calculates a pulse in the second shooting scene. Furthermore, since the operation section can reset for each pulse calculating section, when shooting the third shooting scene, for example, it is possible to reset the pulse calculating section used in the first shooting scene and to use as the pulse calculating section of the third shooting scene. Thus, the utility of an operator of the lighting apparatus is more improved, and it is possible to serve as a user-friendly lighting apparatus. Furthermore, even when taking a picture of variable scenes under various conditions and even for an operator that performs complicated shooting, it is possible to grasp the used battery content and the like of a battery that corresponds to each shooting scene, which is preferable.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An electronic apparatus which can use a battery different in physical properties, comprising:

an executions of single reference operation setting unit which converts a battery content initially stored in said battery to a used charge amount for a single reference operation of the electronic apparatus and sets the battery content to a set number of executions of said single reference operation;

an executions of single reference operation calculating unit which converts a used charge amount of said battery used by accumulated operations of the electronic apparatus to a charge amount used in said single reference operation and calculates the used charge amount of said battery as a calculated number of executions of said single reference operation of said apparatus, to convert the accumulated operations of the apparatus to said single reference operation;

a detecting unit which detects one of a battery remaining content and a used battery content as a detected number of executions of said single reference operation based on the set number of executions of said single reference operation and the calculated number of executions of said single reference operation; and a displaying unit which displays the detected number of executions of said single reference operation.

2. A lighting apparatus of a camera which can use a battery different in physical properties, comprising:

an execution setting unit which converts a charge amount initially stored in said battery to a charge amount used in a single reference lighting and sets the charge amount initially stored to a set number of executions of said single reference lighting;

a single reference lighting execution calculating unit which calculates a used charge amount of said battery required for lighting operations based on a lighting amount per each of the lighting operations and obtains the calculated used charge amount by converting the calculated used charge amount to a calculated number of executions of said single reference lighting, to convert accumulation of the lighting operations to said single reference lighting;

a detecting unit which detects one of a battery remaining content and a used battery content as a detected number of executions of single reference lighting based on the set number of executions of single reference lighting and the calculated number of executions of single reference lighting; and a displaying unit which displays the detected number of single reference lighting.

3. The lighting apparatus of the camera according to claim 2, wherein said single reference lighting execution calculating unit counts the number of pulses at a time of lighting, compares the counted pulse number with a pulse number at a time of reference lighting, which is stored in advance, and converts the counted pulse number to a number of executions of said single reference lighting.

4. The lighting apparatus of the camera according to claim 2, wherein said single reference lighting execution calculating unit compares a used charge amount at a time of lighting with a used charge amount at a time of single reference lighting, which is stored in advance, and converts the used charge amount at the time of lighting to said number of executions of the single reference lighting.

5. A lighting apparatus for an imaging device, wherein said lighting apparatus comprises:

a light emitting section which emits an illumination light illuminating a subject;

an electric source loading section which loads a detachable electric source supplying electric power for said light emitting section to emit light;

a lighting amount detecting section which detects a lighting amount of said light emitting section at a time of each lighting operation and converts the detected lighting amount to a pulse number;

a pulse calculating section which calculates the pulse number at the time of each lighting operation converted by said lighting amount detecting section and stores the calculated pulse number;

a CPU which calculates a used electric quantity based on a pulse calculating value calculated by said pulse calculating section; and a displaying section which displays the calculated used electric quantity.

6. The lighting apparatus for the imaging device according to claim 5, wherein said lighting apparatus further comprises an initial content of electric source setting section which sets a content of said electric source when loading the electric source in said electric source loading section, and wherein:

said electric source is one of a fully charged nickel-hydride battery, unused lithium-ion battery, unused manganese battery, and unused alkaline battery;

an initial battery content corresponding to said battery is set in said initial content of electric source setting section;

said CPU calculates a remaining electric source content of said electric source based on said initial battery content set in said initial content of electric source setting section and said used electric quantity; and said displaying section displays one of said used electric quantity and said remaining electric source content.

7. The lighting apparatus for the imaging device according to claim 5, wherein said lighting apparatus further comprises:

a lighting mode setting section which selects and sets one lighting mode from a plurality of lighting modes that causes said light emitting section to emit light in a predetermined lighting amount; and a memory section which stores in advance a pulse number corresponding to the predetermined lighting amount in said plurality of lighting modes, and wherein said CPU converts one of said used electric quantity and said remaining electric source content to a number of executions in a lighting mode selected by said lighting mode setting section, and said displaying section displays said number of executions converted by said CPU.

8. The lighting apparatus for the imaging device according to claim 5, wherein said lighting apparatus further comprises:

a lighting mode setting section which sets one of a first lighting mode causing said light emitting section to emit an illumination light, and a second lighting mode which is used for calculation of a number of executions displayed in said displaying section; and a memory section which stores in advance a pulse number corresponding to a lighting amount of said lighting mode, and wherein said CPU converts one of said used electric quantity and said remaining electric source content to a number of executions in said second lighting mode set by said lighting mode setting section, and said displaying section displays said number of executions converted by said CPU.

9. The lighting apparatus for the imaging device according to claim 5, wherein said lighting apparatus further comprises a holding amount of electric current computing section which computes a holding amount of electric current of said lighting apparatus and converts the computed holding amount of electric current to a pulse number, and wherein said pulse calculating section calculates the pulse number converted by said lighting amount detecting section, together with the pulse number converted by said holding amount of electric current computing section.

10. The lighting apparatus for the imaging device according to claim 9, wherein said holding amount of electric current computing section computes a holding amount of electric current from a product of a period during which the holding current flows and a holding amount of electric current per unit time stored in advance in the memory section, the period being counted by the CPU, and converts the computed holding amount of electric current to a pulse number.

11. The lighting apparatus for the imaging device according to claim 5, wherein said lighting apparatus further comprises:

an operating section inputting a reset signal that resets a calculated pulse number stored in said pulse calculating section; and a removable detecting section detecting mounting/dismounting of said electric source, wherein the calculated pulse number of said pulse calculating section is reset by the input of reset signal from said operating section or by the detection of mounting/dismounting of the electric source by said removable detecting section.

12. A method of computing a used electric quantity of a lighting apparatus for an imaging device that emits an illumination light illuminating a subject, the method comprising:

a lighting amount detecting step detecting, when said lighting apparatus emits light, a lighting amount at a time of each lighting operation to convert the lighting amount to a pulse number;

a pulse calculating step calculating in sequence said pulse number which has been converted during the lighting amount detecting step and corresponds to the lighting amount at the time of each lighting operation to compute a pulse calculating value; and a used electric quantity calculating step of calculating a used electric quantity based on said pulse calculating value.

13. The method of computing the used electric quantity of the lighting apparatus according to claim 12, comprises a holding electric current calculating step computing a calculating value of holding electric current from when a battery is loaded in said lighting apparatus, wherein said used electric quantity calculating step calculates a used electric quantity based on said pulse calculating value and said calculating value of the holding electric current.

14. A remaining battery content computing method of a lighting apparatus for an imaging device that emits an illumination light illuminating a subject, the method comprising:

a battery content setting step setting a full battery content of a detachable battery loaded in the lighting apparatus by converting the full battery content to a full battery pulse number;

a lighting amount detecting step detecting, when said lighting apparatus emits light, a lighting amount at a time of each lighting operation to convert the lighting amount to a pulse number;

a pulse calculating step calculating in sequence said pulse number corresponding to a plurality of executions to compute a pulse calculating value;

a used electric quantity calculating step calculating a used electric quantity based on said pulse calculating value; and a remaining battery content computing step computing a remaining battery content using said full battery pulse number and said used electric quantity.

15. The remaining battery content computing method of the lighting apparatus according to claim 14, comprises a holding electric current calculating step computing a calculating value of holding electric current from when a battery is loaded in said lighting apparatus, wherein said used electric quantity calculating step calculates a used electric quantity based on said pulse calculating value and said calculating value of holding electric current.

16. The lighting apparatus for the imaging device according to claim 6, wherein said lighting apparatus further comprises:

a lighting mode setting section which selects and sets one lighting mode from a plurality of lighting modes that causes said light emitting section to emit light in a predetermined lighting amount; and a memory section which stores in advance a pulse number corresponding to the predetermined lighting amount in said plurality of lighting modes, and wherein said CPU converts one of said used electric quantity and said remaining electric source content to a number of executions in a lighting mode selected by said lighting mode setting section, and said displaying section displays said number of executions converted by said CPU.

17. The lighting apparatus for the imaging device according to claim 6, wherein said lighting apparatus further comprises:

a lighting mode setting section which sets one of a first lighting mode causing said light emitting section to emit an illumination light, and a second lighting mode which is used for calculation of a number of executions displayed in said displaying section; and a memory section which stores in advance a pulse number corresponding to a lighting amount of said lighting mode, and wherein said CPU converts one of said used electric quantity and said remaining electric source content to a number of executions in said second lighting mode set by said lighting mode setting section, and said displaying section displays said number of executions converted by said CPU.

* * * * *